United States Patent
Kunz et al.

(10) Patent No.: US 10,556,577 B2
(45) Date of Patent: Feb. 11, 2020

(54) CONTROL DEVICE AND METHOD FOR OPERATING A BRAKE SYSTEM OF A VEHICLE

(71) Applicant: Robert Bosch GmbH, Stuttgart (DE)

(72) Inventors: Michael Kunz, Steinheim an der Murr (DE); Jochen Feinauer, Neuenstein (DE); Stefan Strengert, Stuttgart (DE)

(73) Assignee: Robert Bosch GmbH, Stuttgart (DE)

(*) Notice: Subject to any disclaimer, the term of this patent is extended or adjusted under 35 U.S.C. 154(b) by 61 days.

(21) Appl. No.: 15/550,071

(22) PCT Filed: Jan. 15, 2016

(86) PCT No.: PCT/EP2016/050783
§ 371 (c)(1),
(2) Date: Aug. 10, 2017

(87) PCT Pub. No.: WO2016/128172
PCT Pub. Date: Aug. 18, 2016

(65) Prior Publication Data
US 2018/0022335 A1    Jan. 25, 2018

(30) Foreign Application Priority Data

Feb. 10, 2015   (DE) .......................... 10 2015 202 337

(51) Int. Cl.
*B60T 17/22* (2006.01)
*B60T 7/02* (2006.01)
(Continued)

(52) U.S. Cl.
CPC .............. *B60T 17/221* (2013.01); *B60T 7/02* (2013.01); *B60T 7/12* (2013.01); *B60T 13/745* (2013.01);
(Continued)

(58) Field of Classification Search
CPC ........ B60T 17/221; B60T 13/745; B60T 7/02; B60T 7/12; B60T 8/885; B60T 13/662;
(Continued)

(56) References Cited

U.S. PATENT DOCUMENTS

| | | | |
|---|---|---|---|
| 5,709,438 A * | 1/1998 | Isakson | B60T 8/328 188/358 |
| 8,348,352 B2 * | 1/2013 | Nishino | B60T 7/042 303/115.2 |

(Continued)

FOREIGN PATENT DOCUMENTS

| DE | 102012205859 A1 | 10/2012 |
|---|---|---|
| DE | 102012210809 A1 | 1/2013 |

(Continued)

OTHER PUBLICATIONS

Translation of German Patent No. DE 102014200071 provided by https://worldwide.espacenet.com/, obtained Jan. 2, 2019.*

(Continued)

*Primary Examiner* — Pamela Rodriguez
(74) *Attorney, Agent, or Firm* — Norton Rose Fulbright US LLP; Gerard Messina

(57) ABSTRACT

A control device for a brake system of a vehicle includes an electronic device configured to perform a method including determining, taking into account a specified braking of a driver of the vehicle or of an automatic control system of the vehicle, a first item of information regarding a current usability of a hydraulic device of the brake system and a second item of information regarding a current usability of a brake booster of the brake system, which first target portion of a brake pressure increase is to be provided by the hydraulic device, and which second target portion of the brake pressure increase is to be provided by the brake booster, and controlling the hydraulic device and/or the brake booster so that the first target portion of the brake pressure increase is provided by the hydraulic device and the second target portion is provided by the brake booster.

10 Claims, 2 Drawing Sheets

(51) Int. Cl.
    *B60T 7/12*   (2006.01)
    *B60T 13/74*  (2006.01)
    *B60W 40/12*  (2012.01)
    *B60W 50/02*  (2012.01)

(52) U.S. Cl.
    CPC ........ *B60W 40/12* (2013.01); *B60W 50/0205* (2013.01)

(58) Field of Classification Search
    CPC .. B60T 13/686; B60W 40/12; B60W 50/0205
    USPC ......... 303/20, 122.05, 122.09, 122.13, 115.2
    See application file for complete search history.

(56) References Cited

U.S. PATENT DOCUMENTS

| | | | | |
|---|---|---|---|---|
| 9,031,757 | B2* | 5/2015 | Shimizu | B60T 8/17 |
| | | | | 701/70 |
| 10,077,037 | B2* | 9/2018 | Foitzik | B60T 17/221 |
| 2013/0252784 | A1* | 9/2013 | Kinoshita | B60W 10/182 |
| | | | | 477/92 |

FOREIGN PATENT DOCUMENTS

| | | |
|---|---|---|
| DE | 102013203824 A1 | 9/2014 |
| DE | 102014200071 A1 | 9/2014 |
| DE | 102013208671 A1 | 11/2014 |
| JP | 2001513041 A | 8/2001 |
| JP | 2009045982 A | 3/2009 |
| JP | 2010120522 A | 6/2010 |
| JP | 2013199165 A | 10/2013 |

OTHER PUBLICATIONS

Translation of German Patent No. DE 102012210809 provided by https://worldwide.espacenet.com/, obtained Jan. 2, 2019.*
International Search Report dated Mar. 22, 2016 of the corresponding International Application PCT/EP2016/050783 filedJan. 15, 2016.

* cited by examiner

CONTROL DEVICE AND METHOD FOR OPERATING A BRAKE SYSTEM OF A VEHICLE

CROSS-REFERENCE TO RELATED APPLICATIONS

The present application is the national stage of International Pat. App. No. PCT/EP2016/050783 filed Jan. 15, 2016, and claims priority under 35 U.S.C. § 119 to DE 10 2015 202 337.0, filed in the Federal Republic of Germany on Feb. 10, 2015, the content of each of which are incorporated herein by reference in their entireties.

FIELD OF THE INVENTION

The present invention relates to a brake system of a vehicle, to a vehicle designed for automatic driving, to a control device for a brake system of a vehicle, to a method for operating a brake system of a vehicle, and to a method for automated driving of a vehicle.

BACKGROUND

DE 10 2013 203 824 A1 describes a control device for a brake system of a vehicle and a method for operating a brake system of a vehicle. When the control device is used or the corresponding method is carried out, at least one first hydraulic component of the respective brake system and a second hydraulic component of the same brake system are controlled according to a target operating mode that is to be carried out, whereby it is intended to be possible to set at least one brake pressure, corresponding to a specified braking, in the wheel brake cylinder of the brake system. Previously, the target operating mode to be carried out is selected from at least two operating modes that can be carried out. In particular, when selecting the target operating mode that is to be carried out, a type of the vehicle equipped with the respective brake system and/or a type of at least one component of the brake system are taken into account.

SUMMARY

Using the present invention, it is possible to quickly and reliably compensate a functional impairment/failure of at least one hydraulic device of the brake system or of a brake booster of the brake system. For example, when using the present invention the brake booster itself can still reliably carry out the specified braking even when there is a total failure of the at least one hydraulic device of the brake system. Likewise, a total failure of the brake booster can be compensated by quickly and reliably carrying out the specified braking using the at least one hydraulic device. The present invention thus contributes to increasing a safety standard of the brake system realized in this way.

The present invention creates in particular an improved safety standard for a vehicle designed for automated driving. When there is an execution of an autonomous braking (i.e., a braking requested by the automated control system without an actuation of the brake actuating element by the driver), a functional impairment/failure of the at least one hydraulic device can advantageously be compensated using the brake booster. Likewise, a functional impairment/failure of the brake booster can be intercepted by the at least one hydraulic device. Thus, even for the case in which the at least one hydraulic device has a comparatively high first failure rate and/or the brake booster has a relatively high second failure rate, the requested autonomous braking can still be carried out with a high degree of probability. In this way, a core requirement for automated/highly automated driving is met.

For example, the electronic device can at least be designed to optionally decide, taking into account the specified braking, the at least one first item of information, and the at least one second item of information, whether the respective brake pressure increase is to be provided 100% by the at least one hydraulic device and 0% by the brake booster, or 0% by the at least one hydraulic device and 100% by the brake booster. As an optional development, the electronic device can also be designed so that the respective brake pressure increase is provided x % by the at least one hydraulic device 10 and 100-x % by brake booster 12, where x can represent at least one value of or between 0 and 100. In this way, there is a high flexibility for reacting to situations in which the at least one hydraulic device with a brake booster can be used only to a limited extent, or cannot be used.

In a specific embodiment, the electronic device is configured to decide, at least taking into account a first signal relating to a provision of at least one first supply current to the at least one hydraulic device as the at least one first item of information and/or a second signal relating to a provision of a second supply current to the brake booster as the at least one second item of information, which first target portion of the respective brake pressure increase is to be provided by the at least one hydraulic device and which second target portion of the respective brake pressure increase is to be provided by the brake booster. The electronic device can thus react quickly to an inadequate current supply/energy supply to the at least one hydraulic device or the brake booster.

The electronic device can in addition be designed to decide whether a standstill of the vehicle is to be secured by an automatic parking brake or by locking a transmission of the vehicle using a parking pawl, and to correspondingly control the automatic parking brake or the parking pawl. A standstill of the vehicle can thus optionally be secured by the automatic parking brake or by the locking of the transmission of the vehicle by the parking pawl.

The advantages listed above are also ensured in a brake system having such an electronic device.

In an advantageous specific embodiment of the brake system, the at least one hydraulic device is integrated into an ESP system of the brake system. Preferably, in this case a first subunit of the control device is integrated into an ESP control device of the ESP system. Alternatively or in addition, a second subunit of the control device can be integrated into a brake booster control device of the brake booster. Optionally, at least one third subunit of the control device can also be integrated into a further device, such as a drive train control device of a drive train of the vehicle. In this way, it is not necessary to fashion a separate housing for the control device.

Preferably, the at least one hydraulic device is connected to a first power supply network or power supply power pack fashioned in the brake system, via which the at least one hydraulic device can be connected or is connected to a first energy source of the vehicle, while the brake booster is connected to a second power supply network or power supply power pack fashioned in the brake system, via which the brake booster can be connected or is connected to a second energy source of the vehicle. A failure of the first energy source and the associated functional impairment of the at least one hydraulic device, are thus capable of being compensated by the continued ensured functional capacity of the brake booster. Correspondingly, a failure of the second energy source that triggers a functional impairment of the brake booster can also still be compensated on the basis of at least one first supply current that continues to be provided to the at least one hydraulic device.

In a further advantageous specific embodiment of the brake system, the automatic parking brake is also connected to the first power supply network or power supply power pack, while the parking pawl is likewise connected to the second power supply network or power supply power pack. A functional impairment of the automatic parking brake caused by a failure of the first energy source can thus be compensated using the parking pawl. Correspondingly, a functional impairment of the parking pawl triggered by a failure of the second energy source can also be compensated using the automatic parking brake.

The advantages stated above are also ensured in a vehicle that is designed for automated driving, through its corresponding brake system. The vehicle additionally includes the automated control system that is designed to determine a target trajectory of the vehicle, taking into account at least one sensor signal from at least one environmental acquisition sensor of the vehicle, and, on the basis of the determined target trajectory and a current speed of the vehicle, to determine the specified braking and to output it to the control device.

The advantages described above can also be realized through a carrying out of a corresponding method for operating a brake system of a vehicle. The method can be developed according to the specific embodiments described above of the brake system.

In an advantageous specific embodiment of the method, as the at least one first item of information it is ascertained at least whether at least one first supply current is provided to the at least one hydraulic device, and/or as the at least one second item of information it is at least ascertained whether a second supply current is provided to the brake booster. For example, as the at least one first item of information it can at least be ascertained whether a first energy source of the vehicle, connected to the at least one hydraulic device via a first current supply network, has failed, and/or as the at least one second item of information it can at least be ascertained whether a second energy source of the vehicle, connected to the brake booster via a second current supply network, has failed. A reaction to the corresponding item of information can subsequently take place via an optimized decision relating to the first target portion of the respective brake pressure increase (by the at least one hydraulic device) and relating to the second target portion of the respective brake pressure increase (by the brake booster).

As an advantageous development of the method, it can additionally be decided whether a standstill of the vehicle is secured by an automatic parking brake or by locking a transmission of the vehicle using a parking pawl. Thus, even when there is a failure of one of the two energy sources of the vehicle, an undesired rolling away of the vehicle can be reliably prevented.

A carrying out of the method for the automated driving of a vehicle also provides the advantages described above. It is to be noted that the method for automated driving of a vehicle can be developed according to the above-described specific embodiments of the method for operating a brake system. Further features and advantages of the present invention are explained in the following on the basis of the Figures.

DETAILED DESCRIPTION

Figure 1:
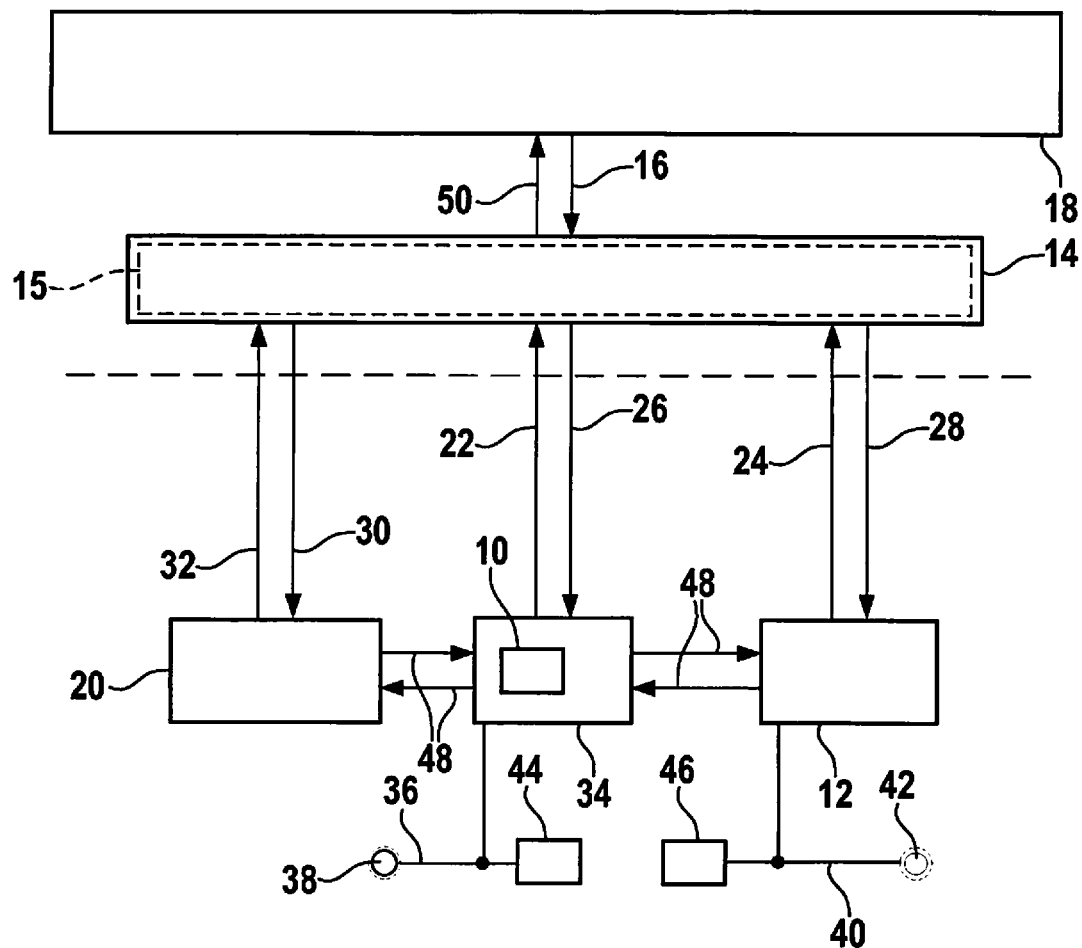
FIG. 1 is a schematic representation of a brake system according to an example embodiment of the present invention.

FIG. 1 is a schematic representation of a brake system according to an example embodiment of the present invention.

The brake system schematically shown in FIG. 1 can be used in a vehicle or motor vehicle. In particular, a vehicle/motor vehicle designed for automated driving can be equipped with the brake system of FIG. 1. However, it is to be noted that the use of the brake system of FIG. 1 is not limited to a particular vehicle type/motor vehicle type.

The brake system of FIG. 1 includes at least one wheel brake cylinder, which however is not shown for purposes of clarity. For example, the at least one wheel brake cylinder can be connected to a master brake cylinder (not shown) of the brake system via at least one brake circuit. It is to be noted that a realization of the brake system described hereinafter is limited neither to a particular number of its wheel brake cylinders, to a particular wheel brake cylinder type, to an equipping with the master brake cylinder, or to a particular type of master brake cylinder.

The brake system also has at least one hydraulic device 10, and at least one brake pressure in the at least one wheel brake cylinder can be increased by (operation of) the at least one hydraulic device 10. The at least one hydraulic device 10 can for example be at least one pump and/or at least one motorized piston-cylinder device. In particular, hereinafter the at least one hydraulic device 10 can be understood as a plurality of pumps of the brake system and/or a plurality of piston-cylinder devices of the brake system, and also as all pumps of the brake system and/or all piston-cylinder devices of the brake system. Thus, the representation of only the one hydraulic device 10 in FIG. 1 is to be understood only as an example. Likewise, a realization of the at least one hydraulic device 10 is not limited to the at least one pump and/or the at least one motorized piston-cylinder device.

The brake system also has a brake booster 12. Preferably, brake booster 12 is an electromechanical brake booster. However, it is to be noted that a realization of the brake system is not limited to a particular type of brake booster 12.

Moreover, the brake system has a control device 14 having an electronic device 15. Electronic device 15 is designed to control the at least one hydraulic device 10 and/or the brake booster 12, at least taking into account a specified braking 16 of a driver of the vehicle or of an automatic control system 18 of the vehicle. It is preferable if, by the controlling of the at least one hydraulic device 10 and/or of brake booster 12 by electronic device 15, at least one brake pressure increase can be brought about in the at least one wheel brake cylinder, corresponding to specified braking 16. This can be understood as meaning that from the at least one brake pressure increase in the at least one wheel brake cylinder, there results an overall deceleration of the vehicle that corresponds to specified braking 16. Possibly, the at least one brake pressure increase in the at least one wheel brake cylinder can also be capable of being realized in such a way that the deceleration of the vehicle resulting from the at least one brake pressure increase, together with a generator braking torque of at least one electric motor 20 used as a generator, corresponds to specified braking 16. The respective brake pressure increase in the at least one wheel brake cylinder can be brought about in wheel brake cylinder-specific fashion or in brake circuit-specific fashion, or can be the same for all wheel brake cylinders.

Above all, electronic device 15 is designed to decide which first target portion of the respective brake pressure increase is to be provided by (operation of) the at least one hydraulic device 10, and which second target portion of the respective brake pressure increase is to be provided by (operation of) brake booster 12. This decision takes place taking into account specified braking 16, and additionally taking into account at least one first item of information 22 relating to a current usability of the at least one hydraulic device 10 and at least one second item of information 24 relating to a current usability of brake booster 12. Subsequently, electronic device 15 is designed to control the at least one hydraulic device 10 (by at least one first control signal 26) and/or brake booster 12 (by at least one second control signal 28) in such a way that the respective brake pressure increase can be provided in the first target portion by the operation of the at least one hydraulic device 10, and in the second target portion by the operation of brake booster 12.

Thus, in the brake system of FIG. 1, for each specified braking 16 it can be (freely) decided whether for its execution the at least one hydraulic device 10 is to be used to a greater extent, or solely, and whether brake booster 12 is to be used to a lesser extent, or not at all, or whether for its execution brake booster 12 is to be used to a greater extent or solely and the at least one hydraulic device 10 is to be used to a lesser extent or not at all. By taking into account the at least one first item of information 22 and at least one second item of information 24 in the decision, it can be ensured that the subsequent controlling of the at least one hydraulic device 10 (by the at least one first control signal 26) and/or of brake booster 12 (by the at least one second control signal 28) is optimized with regard to the current usability of the at least one hydraulic device 10 and the current usability of brake booster 12. In particular, an amount of work that is to be performed in order to bring about the respective brake pressure increase can be divided in a targeted manner between the at least one hydraulic device 10 and brake booster 12 in such a way that a reduced or absent usability of the at least one hydraulic device 10 or of brake booster 12 can be compensated. The desired (i.e., meeting specified braking 16) brake pressure increase can be realized in the at least one wheel brake cylinder (in wheel brake cylinder-specific fashion, brake circuit-specific fashion, or equally for all wheel brake cylinders) even in those situations in which the at least one hydraulic device 10 or brake booster 12 have very limited usability or cannot be used.

It is to be noted that the decision concerning what first target portion of the respective brake pressure increase is to be provided by the at least one hydraulic device 10 and what second target portion of the respective brake pressure increase is to be provided by brake booster 12 is not necessarily to be understood as a determining of the first target portion and/or of the second target portion. Instead, electronic device 15 can also determine/select at least one first target operating quantity of the at least one hydraulic device 10 and/or at least one second target operating quantity of brake booster 12. The at least one first target operating quantity of the at least one hydraulic device 10 can for example be at least one first target supply current of the at least one hydraulic device 10 and/or at least one target rotational speed of the at least one hydraulic device 10. Correspondingly, the at least one second target operating quantity of brake booster 12 can be a second target supply current of brake booster 12 and/or a target motor rotational speed of a motor of brake booster 12. The at least one target operating quantity and the at least one second target operating quantity are however not limited to the examples named here. Likewise, the decision can also be understood as a selection/determination of at least one target operating mode of the at least one hydraulic device 10 and of brake booster 12.

For example, electronic device 15 is at least designed to optionally decide, taking into account specified braking 16, the at least one first item of information 22, and the at least one second item of information 24, whether the respective brake pressure increase is to be provided 100% by (operation of) the at least one hydraulic device 10 and 0% by (operation of) brake booster 12, or 0% by (operation of) the at least one hydraulic device 10 and 100% by (operation of) brake booster 12. It is possible that the respective brake pressure increase is provided either exclusively by the operation of the at least one hydraulic device 10 or exclusively by the operation of brake booster 12. Specifically when there is a failure of the at least one hydraulic device 10, in this way brake booster 12 can be used. Correspondingly, when there is a failure of brake booster 12, this booster can be replaced by the operation of the at least one hydraulic device 10.

However, electronic device 15 can also be designed to decide, taking into account specified braking 16, the at least one first item of information 22, and the at least one second item of information 24, that the respective brake pressure increase is to be provided x % by (operation of) the at least one hydraulic device 10 and 100-x % by (operation of) brake booster 12, where x can stand for a value of one of or between 0 and 100. In this way, it is also possible to react to decreasing usability of the at least one hydraulic device 10 with an additional/reinforced operation of brake booster 12. Likewise, when there is decreasing usability of brake booster 12, the at least one hydraulic device 10 can be used additionally/to a reinforced degree. In this way, there is a high degree of flexibility for reacting to situations in which the at least one hydraulic device 10 or brake booster 12 have only limited usability.

The at least one electric motor 20 can for example be a drive motor of the vehicle, at least one starter generator, and/or at least one element in the drive train (electric machine) that provides a longitudinal force. All elements that influence a longitudinal capability of the vehicle can be understood as the at least one electric motor 20.

In an advantageous development, the at least one electric motor 20 can also be controlled by electronic device 15 using at least one third control signal 30. In this case, in particular electronic device 15 can be designed to decide, taking into account specified braking 16 and at least one third item of information 32 relating to a current usability of the at least one electric motor 20, which at least one generator braking torque is to be brought about by the at least one electric motor 20 and to correspondingly control the at least one electric motor 20 using the at least one third control signal 30. The at least one first item of information 22 and/or the at least one second item of information 24 can also be taken into account here. Electronic device 15 can subsequently decide which brake pressure increase in the at least one wheel brake cylinder is desired, taking into account specified braking 16, the at least one third item of information 32, and/or the at least one generator braking torque, and subsequently can make the decision regarding the first target portion of the respective brake pressure increase and the second target portion of the respective brake pressure increase.

Electronic device 15 can in particular be designed to decide, at least taking into account a first signal (not shown) relating to a provision of at least one first supply current to the at least one hydraulic device 15 as the at least one first item of information 22 and/or a second signal (not shown) relating to a provision of a second supply current to brake booster 12 as the at least one second item of information 24, which first target portion of the respective brake pressure increase is to be provided by the at least one hydraulic device 10 and which second target portion of the respective brake pressure increase is to be provided by brake booster 12. In this way, electronic device 15 can react quickly to an inadequate/missing current supply to the at least one hydraulic device 10 or to brake booster 12, and can ensure that the desired (i.e., meeting specified braking 16) brake pressure increase nonetheless remains capable of being brought about in the at least one wheel brake cylinder. A particularly advantageous design of electronic device 15/the brake system for providing this advantage is further described below. However, as the at least one first item of information 22, a status of the at least one hydraulic device 10 can be forwarded. Correspondingly, a status of brake booster 12 can be forwarded as the at least one second item of information 24.

The at least one hydraulic device 10 can for example be integrated into an ESP system 34 of the brake system. This is advantageous in particular if the at least one hydraulic device 10 is at least one pump. The at least one first item of information 22 can thus also include a status of ESP system 34. In this case, when there is a failure of brake booster 12, all of its functions can be covered by ESP system 34. Correspondingly, when there is a failure of ESP system 34, its functionalities can be taken over at least in part by brake booster 12.

In the specific embodiment of FIG. 1, the at least one hydraulic device 10/ESP system 34 is connected to a first current supply network or current supply power pack 36 fashioned in the brake system. First current supply network or current supply power pack 36 is to be understood as an electronic device via which the at least one hydraulic device 10/ESP system 34 can be connected or is connected to a first energy source 38 of the vehicle. Using first energy source 38 of the vehicle, at least the at least one first supply current can be provided (via the first current supply network or current supply power pack 36) to the at least one hydraulic device 10/ESP system 34. In contrast, brake booster 12 is connected to a second current supply network or current supply power pack 40 fashioned in the brake system. Second current supply network or current supply power pack 40 is also to be understood as an electronic device via which brake booster 40 can be connected or is connected to a second energy source 42 of the vehicle. For this reason, the second supply current of brake booster 12 can be provided (via second current supply network or current supply power pack 40) to brake booster 12 by second energy source 42 of the vehicle. First energy source 38 and/or second energy source 42 can for example (each) be a battery and/or an on-board vehicle electrical network. The first signal and/or the second signal can thus also be an information signal indicating that first energy source 38/second energy source 42 has failed. Such signals can easily be evaluated by an electronic device 15 having a simple design.

As an advantageous development, an automatic parking brake 44 can also be connected to the first current supply network or current supply power pack 36. Moreover, a parking pawl 46 can likewise be connected to the second current supply network or current supply power pack 40.

In this way, parking pawl 46 remains usable even when automatic parking brake 44 is not usable due to a failure of first energy source 38. Correspondingly, a functionality of automatic parking brake 44 is ensured even when parking pawl 46 is not usable due to a failure of second energy source 42.

Preferably, in particular if automatic parking brake 42 is connected to the first current supply network or current supply power pack 36, and parking pawl 46 is connected to the second current supply network or current supply power pack 40, electronic device 15 is designed to decide (taking into account items of information 22 and 24) whether a standstill of the vehicle is to be secured by automatic parking brake 44 or by locking a transmission (not shown) of the vehicle using parking pawl 46. Subsequently, electronic device 15 can correspondingly control automatic parking brake 44 or parking pawl 46 (using at least one control signal (not shown)). In the case of the optional use of automatic parking brake 44 or parking pawl 46 in order to secure a standstill of the vehicle, items of information 22 and 24 can also be taken into account for the decision. In particular, the at least one information signal indicating that first energy source 38/second energy source 42 has failed is in this way usable in a versatile manner.

However, it is to be noted that the design described in the preceding paragraph of electronic device 15 is advantageous even when automatic parking brake 44 is not connected to the first current supply network or current supply power pack 36, and when parking pawl 46 is not connected to the second current supply network or current supply power pack 40. Likewise, it is to be noted that using electronic device 15 it is also possible to evaluate other items of information relating to a usability of automatic parking brake 44 and/or a usability of parking pawl 46.

It is to be remembered that brake booster 12 is better designed than is automatic parking brake 44 for the compensation of a lack of usability of the at least one hydraulic device 10/ESP system 34 in the traveling vehicle. In particular, even large decelerations of the vehicle can be realized using brake booster 12 without causing pitching of the vehicle.

In the specific embodiment of FIG. 1, control device 14/electronic device 15 is shown as a compact unit. However, in an alternative specific embodiment a first subunit of control device 14/electronic device 15 can also be integrated into an ESP control device of ESP system 34. Moreover, a second subunit of control device 14/electronic device 15 can be integrated into a brake booster control device of brake booster 12. An emergency standstill management system can also be stored in brake booster 12, which, in case of emergency, actively triggers a locking of the transmission by parking pawl 46.

If desired, a third subunit of control device 14/electronic device 15 can also be integrated into a motor control device of the at least one electric motor 20/drive motor. In this way, it is easy to do without an equipping of control device 14 with its own housing. The at least one hydraulic device 10/ESP system 34 and brake booster 12 can also be designed to exchange communication signals 48 with each other. The at least one electric motor 20/drive motor can also be designed to exchange communication signals 48 with the at least one hydraulic device 10/ESP system 34 and/or brake booster 12. Moreover, at least one rotational speed of at least one wheel situated on the at least one wheel brake cylinder can be outputted both to the at least one hydraulic device 10/to ESP system 34 and to brake booster 12. The at least one rotational speed can be used for example for a stability algorithm. Moreover, in this case, even in fallback level operation a functioning of the at least one hydraulic device 10/ESP system 34 and/or of brake booster 12 can be optimized with regard to the at least one rotational speed.

The brake system of FIG. 1 can ensure a deceleration of at least 0.64 g despite the failure of the at least one hydraulic device 10 or of brake booster 12. For example, after a failure of the at least one hydraulic device 10/of ESP system 34, brake booster 12 can optionally bring about a fixed delay value (e.g., 5 m/s$^2$), a modulated/varied delay (intermittent braking to prevent locking of the wheels), a deceleration adapted to at least one transmission initial rotational speed/averaged axial rotational speed, or a deceleration adapted to the signal of at least one rotational speed sensor. The strategies described here are also useful for deceleration/stopping on a roadway having high frictional values. Under such conditions, stabilization of the vehicle is frequently not necessary. Moreover, even in a fallback level operation of the brake system, a combination of braking/stopping, parking/securing, and stabilizing is provided.

Due to its advantageous capacity for compensation (for compensating a failure of the at least one hydraulic device 10 or of brake booster 12), the brake system of FIG. 1 fulfills a core requirement for an automatic/highly automatic driving of the vehicle equipped therewith. Due to the ensured deceleration capacity of the brake system despite the failure of the at least one hydraulic device 10 or of brake booster 12, the brake system can also be used for "driverless driving." A low degree of attentiveness of the driver, frequently present during "driverless driving," is not disadvantageous due to the deceleration capacity of the brake system, which continues to be ensured even when there is failure of the at least one hydraulic device 10 or of brake booster 12.

The brake system can therefore also advantageously work together with automatic control system 18, which controls the automatic driving of the vehicle equipped therewith. For example, automatic control system 18 can in this case be designed to determine a target trajectory of the vehicle, taking into account at least one sensor signal of at least one environmental acquisition sensor (not shown) of the vehicle. On the basis of the determined target trajectory and a current speed of the vehicle, automatic control system 18 can subsequently determine specified braking 16 and output it to control device 14. (Specified braking 16 can for example be a target deceleration of the vehicle.)

In an advantageous development of automatic control system 18, this system can moreover be designed to receive from control device 14 an item of information 50 that for example includes the at least one item of information 22, the at least one second item of information 24, and/or the at least one third item of information 32 (or at least one item of information derived from at least one item of information 22, 24, and 32), and to take this information into account in the determination of the target trajectory of the vehicle. For example, in this case the target trajectory can be adapted to a current functional impairment of the at least one hydraulic device 10 or of brake booster 12. For example, in the trajectory planning carried out by automatic control system 18, a lower pressure buildup dynamic of the at least one hydraulic device 10 that compensates brake booster 12 can be taken into account. Likewise, for the determination of the target trajectory by automatic control system 18, it can be taken into consideration that many brake booster types do not cover all functions of the at least one hydraulic device 10/ESP system 34. Reduced brake system functionalities that may be present of brake booster 12 can thus also be capable of being taken into account in the trajectory planning carried out by automatic control system 18.

As another advantageous development, control device 14/electronic device 15 can also be designed to control an acceleration of the vehicle using the at least one electric motor 20/drive motor. Here, electronic device 15 can also take into account the at least one third item of information 32.

Figure 2:
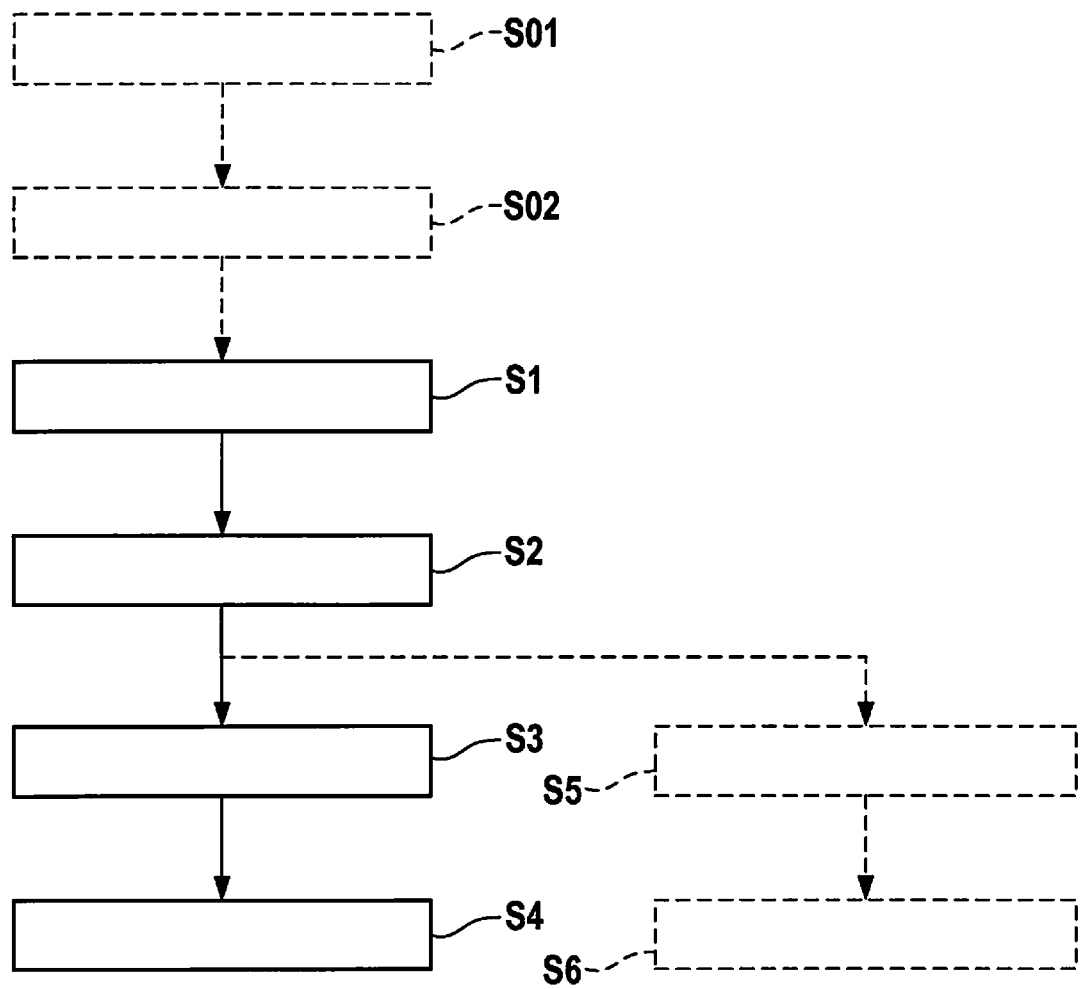
FIG. 2 is a flowchart of a method for operating a brake system of a vehicle, according to an example embodiment of the present invention.

FIG. 2 shows a flow diagram for explaining a specific embodiment of a method for operating a brake system of a vehicle.

The method described below for operating a brake system of a vehicle can be carried out for example using the brake system described above. However, it is to be noted that the ability to carry out the method is not limited to a particular brake system type.

It will be recalled that the method does not only include the controlling of at least one hydraulic device of the brake system taking into account a specified braking of a driver of the vehicle or of an automatic control system of the vehicle. The method thus is not only used to bring about at least one brake pressure increase in at least one wheel brake cylinder of the brake system, corresponding to the specified braking, by the at least one hydraulic device.

In a method step S1 of the method, at least one first item of information relating to a current usability of the at least one hydraulic device is ascertained. Correspondingly, in a method step S2 carried out before, after, or at the same time, at least one second item of information is ascertained relating to a current usability of a brake booster of the brake system. For example, in method step S1, as the at least one first item of information it is at least ascertained whether at least one first supply current is provided to the at least one hydraulic device, or whether a first energy source of the vehicle, connected to the at least one hydraulic device via a first power supply network, has failed. Likewise, in method step S2, as the at least one second item of information it can at least be ascertained whether a second supply current is provided to the brake booster, or whether a second energy source of the vehicle, connected to the brake booster via a second current supply network, has failed. However, as the at least one first item of information 22, a status of the at least one hydraulic device 10 can also be ascertained in method step S1. As an alternative or in addition, a status of brake booster 12 can be ascertained as the at least one second item of information 24 in method step S2.

In a method step S3, taking into account the specified braking and additionally taking into account the at least one first item of information and the at least one second item of information, it is decided which first target portion of the respective brake pressure increase is to be carried out by the at least one hydraulic device, and which second target portion of the respective brake pressure increase is to be carried out by the brake booster. Subsequently, the at least one hydraulic device and/or brake booster are controlled, in a method step S4, in such a way that the first target portion of the respective brake pressure increase is carried out by the at least one hydraulic device, and the second target portion is carried out by the brake booster.

In an optional method step S5, taking into account the at least one first item of information and the at least one second item of information, it can in addition be decided whether a standstill of the vehicle is secured by an automatic parking brake or by locking a transmission of the vehicle using a parking pawl. In a further method step S6, the automatic parking brake or the parking pawl can be correspondingly controlled.

In an example, a method for automated driving of a vehicle includes a method step S01 in which a target trajectory of the traveling vehicle is determined taking into account at least one sensor signal of at least one environmental acquisition sensor of the vehicle. In a further method step S02, there takes place a determination of a specified braking at the brake system of the vehicle, taking into account the determined target trajectory and a current speed of the vehicle. Subsequently, in order to carry out the specified braking at least method steps S1 through S4 can be carried out.

What is claimed is:

1. A control device for a brake system of a vehicle that includes a hydraulic device and a brake booster, the control device comprising:
an electronic device coupled to the hydraulic device and the brake booster, wherein the electronic device is configured to:
determine, based on (a) a specified braking of a driver of the vehicle or of an automatic control system of the vehicle, (b) a first item of information relating to a current usability of the hydraulic device, and (c) a second item of information relating to a current usability of the brake booster of the brake system:
a first target portion of an increase of brake pressure in at least one wheel brake cylinder of the brake system by an amount corresponding to the specified braking that is to be provided by the hydraulic device; and
a second target portion of the increase that is to be provided by the brake booster; and
control at least one of the hydraulic device and the brake booster so that the first target portion is provided by the hydraulic device and the second target portion is provided by the brake booster, wherein at least one of the first item of information indicates whether a first energy source of the vehicle, which is connected to the hydraulic device via a first current supply network, has failed and the second item of information indicates whether a second energy source of the vehicle, which is connected to the brake booster via a second current supply network, has failed.

2. The control device of claim 1, wherein the electronic device is configured to determine, based on the specified braking, the first item of information, and the second item of information, whether 100% of the brake pressure increase is to be provided by the hydraulic device and 0% of the brake pressure increase is to be provided by the brake booster, or vice versa.

3. The control device of claim 1, wherein the first item of information is obtained as a first signal relating to a provision of a first supply current to the hydraulic device and the second item of information is obtained as a second signal relating to a provision of a second supply current to the brake booster.

4. The control device of claim 1, wherein the electronic device is configured to determine whether a standstill of the vehicle is to be secured by an automatic parking brake or by locking a transmission of the vehicle using a parking pawl, and to correspondingly control the automatic parking brake or the parking pawl.

5. An automated driving capable vehicle comprising:
at least one environmental acquisition sensor;
a brake system that includes a wheel brake cylinder, a hydraulic device, a brake booster, and an electronic device coupled to the hydraulic device and the brake booster; and
an automatic control system coupled to the electronic device, wherein:
the automatic control system is configured to:
determine a target trajectory of the vehicle based on at least one sensor signal of the at least one environmental acquisition sensor;
based on the determined target trajectory and a current speed of the vehicle, determine a specified braking; and
output the determined specified braking to the electronic device; and
the electronic device is configured to:
determine, based on (a) the specified braking, (b) a first item of information relating to a current usability of the hydraulic device, and (c) a second item of information relating to a current usability of a brake booster of the brake system:
a first target portion of an increase of brake pressure in the wheel brake cylinder by an amount corresponding to the specified braking that is to be provided by the hydraulic device; and
a second target portion of the increase that is to be provided by the brake booster; and
control at least one of the hydraulic device and the brake booster so that the first target portion is provided by the hydraulic device and the second target portion is provided by the brake booster, wherein at least one of the first item of information indicates whether a first energy source of the vehicle, which is connected to the hydraulic device via a first current supply network, has failed and the second item of information indicates whether a second energy source of the vehicle, which is connected to the brake booster via a second current supply network, has failed.

6. A method for operating a brake system of a vehicle, the brake system including a hydraulic device and a brake booster, the method comprising:
determining, by a control device and based on (a) a specified braking of a driver of the vehicle or of an automatic control system of the vehicle, (b) a first item of information relating to a current usability of the hydraulic device, and (c) a second item of information relating to a current usability of a brake booster of the brake system:
a first target portion of an increase of brake pressure in at least one wheel brake cylinder of the brake system by an amount corresponding to the specified braking that is to be provided by the hydraulic device; and
a second target portion of the increase that is to be provided by the brake booster; and
controlling, by the control device, at least one of the hydraulic device and the brake booster so that the first target portion is provided by the hydraulic device and the second target portion is provided by the brake booster, wherein at least one of the first item of information indicates whether a first energy source of the vehicle, which is connected to the hydraulic device via a first current supply network, has failed and the second item of information indicates whether a second energy source of the vehicle, which is connected to the brake booster via a second current supply network, has failed.

7. The method of claim 6, wherein at least one of the first item of information indicates whether a first supply current is provided to the hydraulic device and the second item of information indicates whether a second supply current is provided to the brake booster.

8. The method of claim 6, further comprising determining whether a standstill of the vehicle is secured by an automatic parking brake or by locking a transmission of the vehicle using a parking pawl.

9. A brake system for a vehicle, the brake system comprising:
- a wheel brake cylinder;
- a hydraulic device;
- a brake booster; and
- an electronic device coupled to the hydraulic device and the brake booster, wherein the electronic device is configured to:
  - determine, based on (a) a specified braking of a driver of the vehicle or of an automatic control system of the vehicle, (b) a first item of information relating to a current usability of the hydraulic device, and (c) a second item of information relating to a current usability of a brake booster of the brake system:
    - a first target portion of an increase of brake pressure in the wheel brake cylinder by an amount corresponding to the specified braking that is to be provided by the hydraulic device; and
    - a second target portion of the increase that is to be provided by the brake booster; and
  - control at least one of the hydraulic device and the brake booster so that the first target portion is provided by the hydraulic device and the second target portion is provided by the brake booster, wherein at least one of the first item of information indicates whether a first energy source of the vehicle, which is connected to the hydraulic device via a first current supply network, has failed and the second item of information indicates whether a second energy source of the vehicle, which is connected to the brake booster via a second current supply network, has failed.

10. A method for automated driving, comprising:
- determining, by a control system, a target trajectory of a vehicle based on at least one sensor signal of at least one environmental acquisition sensor;
- based on the determined target trajectory and a current vehicle speed, determining, by the control system, a specified braking;
- determining, by the control system and based on (a) the specified braking, (b) a first item of information relating to a current usability of a hydraulic device of a brake system, and (c) a second item of information relating to a current usability of a brake booster of the brake system:
  - a first target portion of an increase of brake pressure in at least one wheel brake cylinder of the brake system by an amount corresponding to the specified braking that is to be provided by the hydraulic device; and
  - a second target portion of the increase that is to be provided by the brake booster; and
- controlling, by the control system, at least one of the hydraulic device and the brake booster so that the first target portion is provided by the hydraulic device and the second target portion is provided by the brake booster, wherein at least one of the first item of information indicates whether a first energy source of the vehicle, which is connected to the hydraulic device via a first current supply network, has failed and the second item of information indicates whether a second energy source of the vehicle, which is connected to the brake booster via a second current supply network, has failed.

* * * * *